INVENTOR
Frank Sidebotham Rippingille
BY
ATTORNEY

April 15, 1941.  F. S. RIPPINGILLE  2,238,751
SHOCK ABSORBER
Filed March 9, 1938  2 Sheets-Sheet 2
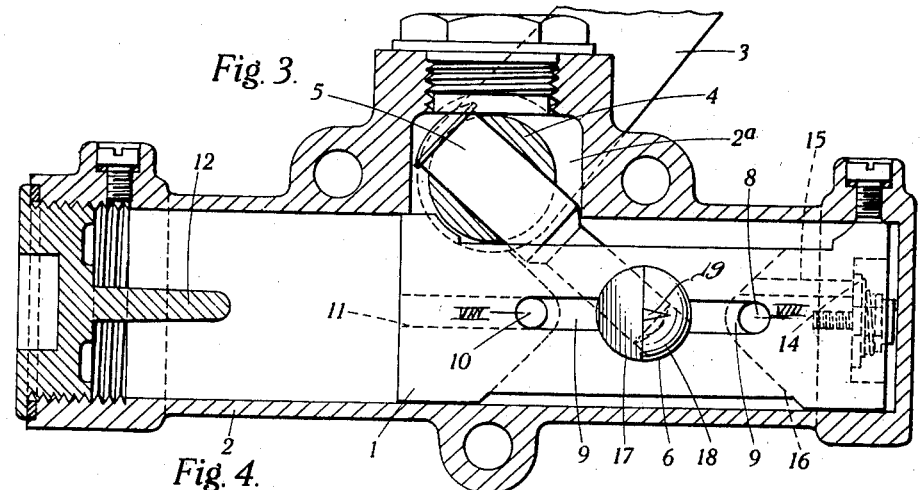
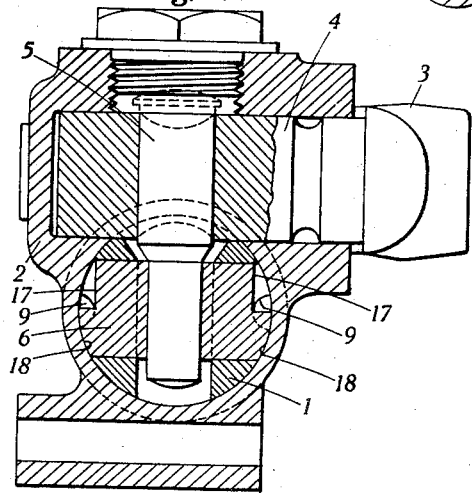
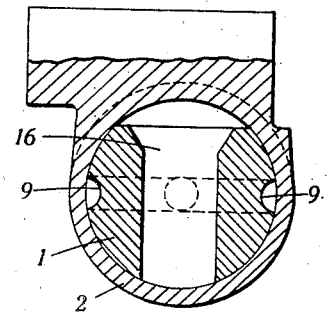
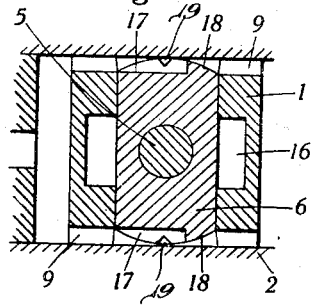
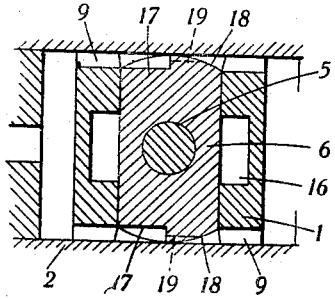
Frank Sidebotham Rippingille INVENTOR
BY
ATTORNEY Patented Apr. 15, 1941

2,238,751

UNITED STATES PATENT OFFICE 2,238,751

SHOCK ABSORBER

Frank Sidebotham Rippingille, Birmingham, England

Application March 9, 1938, Serial No. 194,724
In Great Britain March 10, 1937

3 Claims. (Cl. 188—88)

This invention relates to shock absorbers or vibration damping devices for vehicles, being of the hydraulic or fluid type comprising an oscillatory or reciprocating piston forced alternately to opposite ends of a fluid-containing chamber or cylinder, so that the fluid is caused to pass through a restricted passage or aperture in one or both directions of movement.

It has been recognized that an adjustment of the resistance or damping action should be obtainable to suit the particular load being carried, and manually-adjusted means, such as externally-operated regulating devices, have been provided for this purpose, but such means only enable the resistance to be set for one particular load. However, in the case particularly of commercial or private motor vehicles, where the load is continually varying, according to the number of passengers or the weight of the goods carried, such manual adjustment is altogether inadequate.

Proposals have been made for automatically adjusting the resistance or damping action according to the load, but such proposals have required the use of regulating devices external to the piston and normal cylinder space, involving the provision of a cylinder of larger bulk than is ordinarily necessary and/or the provision of additional parts external of the piston and/or cylinder, thus increasing the size and/or cost of the appliance.

The object of the present invention is to provide improved and simplified means to obtain an automatic adjustment for varying loads without the necessity of employing extra external or internal regulating parts and without increasing the size of the appliance.

According to the invention, a hydraulic shock absorber for vehicles comprises a piston operating in a cylinder or chamber to cause a fluid to flow through a resistance passage which is controlled and has its effective size automatically varied by a regulating device formed or carried by a member disposed within the interior chamber or space containing or occupied by the piston and its actuating means and which, during loading of the vehicle, is positively moved relatively to the resistance passage without the use of auxiliary operating means additional to the normal means for obtaining or permitting relative movement between the piston and its cylinder or chamber due to road shock, the arrangement being such that during the movement of the piston between extreme positions corresponding to the unloaded and fully-loaded conditions of the vehicle the said regulating device directly cooperates with the resistance passage to progressively restrict it whereby the resistance or damping action opposing a subsequent given relative movement of the piston, due to shock, from any initial position between the said unloaded and loaded positions, is automatically varied according to the static load applied, the said regulating device moving relatively to the resistance passage during the said subsequent movement of the piston due to shock.

The regulating device may consist of an oscillatory or rotatable member located within the interior of the piston cylinder or chamber and forming or being directly carried by a part of the mechanism which operates the piston, said member being formed so as to constitute a valve.

The hydraulic shock absorber may comprise a movable piston provided with a resistance passage in it through which the fluid is compelled to flow when the piston is operated, said passage in the piston being controlled and its effective size being automatically varied by a cooperating and relatively-movable regulating member so formed and disposed that during the movement of the piston (while the vehicle is being loaded) between extreme positions corresponding to the unloaded and fully-loaded conditions of the vehicle the said passage is progressively restricted whereby the resistance or damping action opposing a given relative movement of the piston, due to shock, from any initial position between the said unloaded and loaded positions, is automatically varied according to the static load or weight applied. The regulating member is conveniently so formed and disposed that it acts to progressively restrict the resistance passage during the movement of the piston from a position at one side of its mean position to a position on the other side of its mean position. The regulating member may be disposed entirely within the cross-sectional contour of the piston and may comprise one of the normal piston-operating parts of the appliance, being suitably formed or shaped to cooperate with the resistance passage. Thus, the reciprocating piston may be connected by a gudgeon-pin or joint member to a connecting pin or arm located in a slot in said piston and being carried by an oscillating spindle or rock-shaft, the said gudgeon-pin or joint member being formed or provided with, or being arranged to operate, a part that intersects or controls the resistance passage to cause said passage to be more or less restricted in the loaded static condition according to the static load applied.

Figure 1 of the accompanying drawings is a vertical longitudinal section through the cylinder of a vehicle shock absorber according to one form of the invention, showing the piston in elevation and in the position when the vehicle is unloaded.

Figure 3 shows the piston at the end of its checking or damping stroke.

Figure 4 is a transverse section on line IV—IV, Figure 2.

Figure 5 is a transverse section on line V—V, Figure 2.

Figure 7 is a horizontal section through the gudgeon pin on line VII—VII, Figure 2.

Figure 8 is a similar section on line VIII—VIII, Figure 3.

Figure 1:
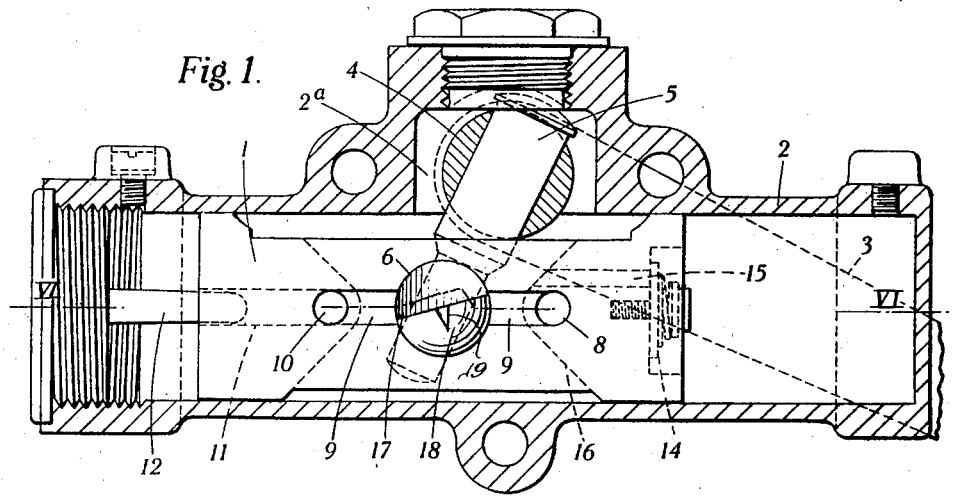

Referring to the form of the invention represented in Figures 1 to 8 of the drawings, the hydraulic shock absorber for a motor vehicle therein shown comprises a piston 1 arranged to reciprocate in a cylinder 2 containing oil or other fluid and adapted to be fixed to the vehicle chassis. The piston is operated by an angularly-movable arm 3 connected through the usual link to the wheel axle so that the said arm 3 moves angularly, in known manner, during load variations or during relative vertical displacements between the axle and chassis. The inner end of the arm 3 is fixed to or carries a horizontal spindle 4 mounted in bearings above the piston 1 so as to extend transversely across a top filling and replenishment chamber 2ª integral with the cylinder 2. Fitting in a hole in the spindle 4 is a depending connecting pin 5 which is passed downwardly through said hole as far as is permitted by a head on its upper end. The lower end of this connecting pin 5 engages a hole in a gudgeon pin 6 which passes through and can turn within a hole extending transversely through the middle of the piston. The arrangement is such that the angular movement of the arm 3 causes the spindle 4 and connecting pin 5 to be moved angularly in one direction or the other, so that the piston is caused to be moved towards the one end or the other of the cylinder whereby the fluid therein is forced from one end to the other through an oil channel or channels. At the right-hand end of the piston are one or more constantly open longitudinal passages 7, 7, (Figure 6) leading into a transverse passage 8 the ends of which open into longitudinal grooves or channels 9, 9, formed in the opposite side faces of the piston. At the left-hand end of the piston these side grooves 9 communicate with a transverse passage 10 from which a central passage 11 leads to the end face of the piston. This passage 11 co-operates with a taper pin 12 carried by the left-hand end of the cylinder. Ducts 13, 13 (Figure 6) lead from the passage 8 to the right-hand end face of the piston but are normally closed by a spring-pressed plate valve 14. There may also be a passage 15 (Figure 1), normally closed by said valve 14, leading from said right-hand end of the piston to a replenishing recess or chamber 16 in the piston.

When the piston moves to the right, due to the axle approaching the chassis and the resultant compression of the vehicle springs, fluid from the right-hand end of the cylinder is compelled to pass through passages 7, 8, 9, 10 and 11 to the left-hand end, the flow of fluid being restricted as hereinafter described to give a damping action, while when the piston moves in the opposite or return direction due to the expansion of the vehicle springs and corresponding movement of arm 3, the fluid is forced back through the said passages and can also pass through the valve-controlled ducts 13, as the valve 14 will open in this direction of movement, the final portion of the return movement of the piston being progressively checked by the action of the taper pin 12.

In the extreme forward position of the piston 1 at the end of its damping or retarding stroke, as shown in Figure 3, the diametrical arcuate periphery of the end projections 18 of the gudgeon pin will accurately fit the interior circumference of the cylinder, as shown in Figure 8, so as substantially to close the side grooves 9 of the piston; but in order that said passages shall not be completely closed, a gap or notch, as indicated at 19 in Figure 8, may be provided in each of the projections 18. During the return stroke of the piston the resistance to the passage of the fluid will progressively be diminished.

Figure 2:
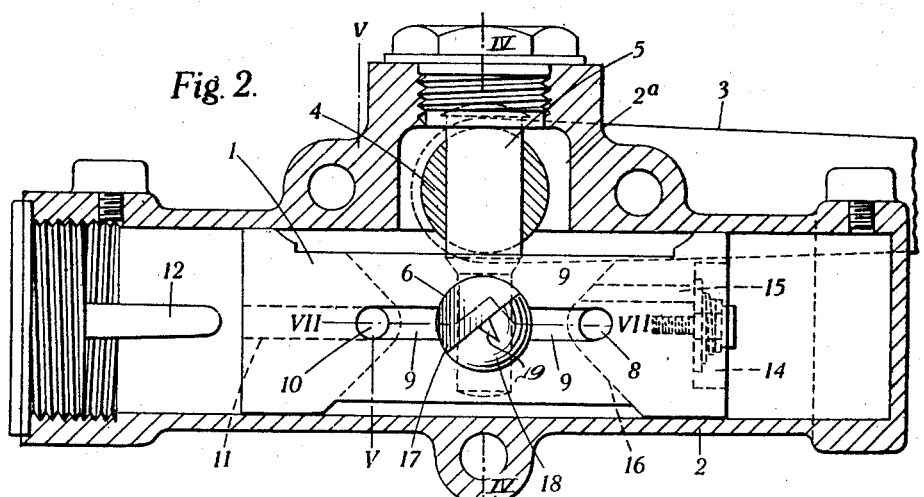
Figure 2 is a similar view, but shows the piston in the position it assumes when the vehicle is fully loaded.
Figure 6:
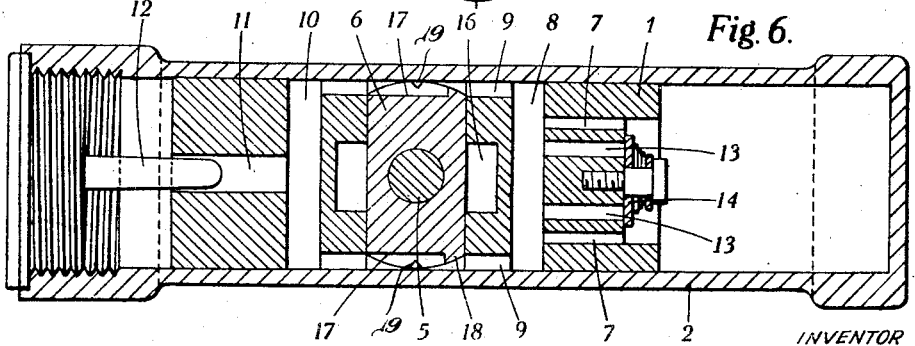
Figure 6 is a horizontal section on line VI—VI, Figure 1.

In order to automatically control the resistance to the flow of fluid from the one end of the piston to the other during the compression of the vehicle springs, and according to the static load, that is, according to the number or weight of the passengers occupying a vehicle, the groove 9 at each side of the piston is intersected by the bearing hole provided in the piston for the gudgeon pin 6. Each end of the said gudgeon pin projects into the path of the corresponding groove 9 and is shaped spherically with a radius corresponding to that of the cylinder wall, which it closely engages. The said spherical end of the gudgeon pin, however, is gapped or cut away, as at 17, leaving a part-spherical projection 18 which, when the vehicle is unloaded, co-operates with the groove 9 to give only a slight restriction to the flow of fluid, as shown in Figures 1 and 6. In this unloaded condition the operating arm 3 will be somewhat below the horizontal position, as shown by broken lines in Figure 1, and the piston will be more or less towards one end of the cylinder, according to the weight of the chassis, the strength of the springs or other conditions connected with the design of the vehicle. When the vehicle takes the full load for which it is normally designed, the piston will take a mid position with the arm 3 horizontal, as shown in Figure 2, when the end projection 18 of the gudgeon pin will take the position shown in Figures 2, 4 and 7 in relation to the groove 9 and cylinder wall, so as to give a greater effective restriction to the fluid passages. As shown in Figure 1, the piston is to the left of its mid position, when the vehicle is in unloaded condition. As the piston moves to the mid position (Figure 2) during loading the passage will be more and more restricted until the piston assumes the fully loaded position Figure 2, and any further movement to the right, due to road shocks, will give a stronger resistance or damping than would be obtained by a similar movement to the right, under road shocks from the position shown in Figure 1 or from any intermediate loaded position due to the resistance passage being more fully closed. The movement of the piston to the left from its mid position in Figure 2 or from the fully loaded position of the vehicle to the unloaded position shown in Figure 1, is controlled by the variance in the load. Between these unloaded and loaded conditions the restriction will progressively vary according to the static load applied to the vehicle due to the varying position of the diametrical arcuate edge of the gudgeon pin end 18 in relation to the curved circumferential contour and to the straight longitudinal contour of the cylinder respectively; it being understood that as the said arcuate edge approaches a vertical position, and therefore more nearly coincides with the circumference of the cylinder, so will the passage of fluid over the spherical end surface be more restricted, whereas when the said edge moves towards a horizontal position and thus its ends progressively recede from the straight longitudinal line of the cylinder surface, so will the flow of fluid over the spherical surface be increased.

With the vehicle either partially or fully loaded, when the vehicle springs are compressed, due to a shock, and the axle thus approaches the chassis, the arm 3 moves upwardly so that, due to the relative angular movement between the gudgeon pin 6 and the piston 1, the grooves or channels 9 are further and progressively restricted by the projecting ends 18 of the said pin. After the ends of the cut-away portions 17 of pin 6 extend beyond the diametrical limits of the passage 9, the upward movement of the arm 3 will bring the notches 19 in the end of pin 18 more or less in communication with the passage 9 during the progressive movement of the piston from its position Fig. 2 to the right. Thus, a progressively increasing resistance to the passage of the fluid and to the movement of the piston is imparted during such further upward movement of the arm 3. It will thus be seen that with a heavier load the resistance or damping action opposing the movement of the piston for a given angular movement of the arm 3 from the initial static loaded position of the parts, will be greater than with a lighter load, such resistance or damping action being automatically and progressively increased according to the static load or weight applied.

With the arrangement above described, the damping is automatically controlled by the load or by the number of passengers in the vehicle; whilst each shock absorber on the vehicle will adjust itself automatically independently of the others, all of the shock absorbers adapting themselves to the distribution of the load. Thus, if a heavier load is at one corner of the vehicle, the fluid channels of the particular shock absorber subjected to the heavier load will be correspondingly restricted.

Instead of the grooves or channels 9 at both sides of the piston being regulated by the gudgeon pin, the groove 9 at the one side only may be so regulated, in which case the end of the gudgeon pin at the opposite side would be flat, so as not to exercise any control on the fluid, whilst the groove 9 at that side would communicate with the front end of the cylinder only through passages controlled by the valve 14, one of the passages 7 being omitted and passage 8 being closed to allow of this action. The said groove 9 which is not regulated by the gudgeon pin could then serve to allow a substantially free return flow of the fluid.

Having fully described my invention, what I desire to claim and secure by Letters Patent is:

1. A hydraulic shock absorber for vehicles for automatically adjusting the degree of damping to suit varying loads comprising a fluid-containing chamber and a piston movable therein one of said parts having a fluid resistance passage between the ends of the piston, piston actuating means within the chamber for operatively connecting the piston to a part of a vehicle, a regulating device controlling and automatically varying the effective size of the resistance passage, said regulating device being carried by a member disposed within the interior space occupied by the piston and its actuating means; the normal piston-actuating means causing positive relative movement between the regulating device and the resistance passage without the use of auxiliary operating means additional to the normal means for causing relative movement between the piston and its chamber due to road shock, and the arrangement being such that during the movement of the piston between extreme positions corresponding to the unloaded and fully-loaded conditions of the vehicle the said regulating device directly co-operates with the resistance passage to progressively restrict it, whereby the resistance opposing a subsequent given relative movement of the piston, due to shock, from any initial position between the said unloaded and loaded positions, is automatically varied according to the static load applied.

2. A hydraulic shock absorber for vehicles for automatically adjusting the degree of damping to suit varying loads comprising a fluid-containing chamber and a piston movable therein one of said parts having a fluid resistance passage between the ends of the piston, piston-actuating means within the chamber, a regulating valve device co-operating with the resistance passage, said device consisting of an oscillatory member located within the interior of the piston-containing chamber and directly carried by the said interior piston-actuating means and the arrangement being such that the fluid resistance for a given initial piston movement due to shock is progressively and automatically varied according to the static load applied.

3. A hydraulic shock absorber for vehicles for automatically adjusting the degree of damping to suit varying loads comprising a fluid-containing chamber and a piston movable therein one of said parts having a resistance passage between the ends of the piston, piston actuating means within the chamber for operatively connecting the piston to a part of a vehicle, and a regulating member co-operating with the resistance passage and disposed within the interior space of the chamber; the normal piston-actuating means causing positive relative movement between the regulating device and the resistance passage without the use of auxiliary parts, and the regulating member being so formed and disposed that during the movement of the piston from an initial unloaded position on one side of its mean or mid position to its said mean or mid position (being a loaded position), the resistance passage is progressively restricted to give automatic adustment of the resistance according to the load.

4. A hydraulic shock absorber for vehicles for automatically adjusting the degree of damping to suit varying loads, comprising a fluid-containing cylinder, a piston therein and having a resistance passage through it, and a regulating member co-operating with the resistance passage and disposed entirely within the cross-sectional contour of the piston, relative movement between said regulating member and the resistance passage taking place during movement of the piston between positions corresponding to the unloaded and fully-loaded conditions of the vehicle whereby the effective size of the passage is progressively restricted during loading.

5. A hydraulic shock absorber for vehicles comprising a cylinder, a piston slidable therein and having a resistance passage in a side thereof, a rock-shaft, a piston operating arm carried by the rock-shaft, and a gudgeon-pin mounted on the piston and slidably engaged by the operating arm, said gudgeon-pin having an end of part-spherical form which has a radius corresponding to that of the cylinder bore and which is shaped so as to co-operate with the resistance passage during its angular movement and thereby progressively restrict said passage as the static load is increased between unloaded and fully-loaded conditions.

6. A hydraulic shock absorber comprising a cylinder, a piston slidable therein and having a resistance passage through it, a rock-shaft, a piston-operating arm carried by the rock-shaft, and a gudgeon-pin mounted on the piston and engaged by the operating-arm, said gudgeon-pin being formed to constitute a regulating valve member co-operating with the resistance passage during its relative angular movement in order to progressively restrict said passage as the static load is increased from an extreme unloaded position of the piston to a fully loaded position.

7. A hydraulic shock absorber for vehicles for automatically adjusting the degree of damping to suit varying loads comprising a fluid-containing cylinder, a piston movable in the cylinder and provided with a resistance passage through which the fluid is compelled to flow when the piston is operated, and a regulating member located in the cylinder and co-operating with said resistance passage, means within the cylinder for operating the piston, said means being adapted to be operatively connected to a part of the vehicle and being operative on the regulating member, and the regulating member being so formed and disposed that during the movement of the piston, while the vehicle is being loaded, between extreme positions corresponding to the unloaded and fully-loaded conditions of the vehicle relative movement between the regulating member and the resistance passage whereby the said passage is progressively restricted and the resistance opposing a given moment of the piston, due to shock, from any initial position between said unloaded and loaded positions, is automatically varied according to the static load applied.

8. A hydraulic shock absorber for vehicles for automatically adjusting the degree of damping to suit varying loads, comprising a fluid-containing cylinder, a piston slidable in the cylinder, said piston having a resistance passage in its walls extending between opposite ends, and means within the cylinder for operating the piston, said means including an oscillating pin having an end formed to constitute a regulating valve that co-operates with the resistance passage to cause the latter to be progressively restricted during loading of the vehicle from an initial unloaded position of the piston to a fully loaded position.

FRANK SIDEBOTHAM RIPPINGILLE.